Nov. 15, 1966 R. E. FREATHY 3,285,611

INTERMIX SELECTOR MECHANISM FOR RECORD CHANGERS

Filed Sept. 12, 1963 5 Sheets-Sheet 1

INVENTOR.
Ralph E. Freathy,
BY Brown, Jackson, Boettcher & Dienner
Attys

INTERMIX SELECTOR MECHANISM FOR RECORD CHANGERS

Filed Sept. 12, 1963 5 Sheets-Sheet 2

INVENTOR.
Ralph E. Freathy,
BY
Attys.

Nov. 15, 1966 R. E. FREATHY 3,285,611

INTERMIX SELECTOR MECHANISM FOR RECORD CHANGERS

Filed Sept. 12, 1963 5 Sheets-Sheet 3

INVENTOR.
Ralph E. Freathy,
BY Brown Jackson Boettcher & Dienner
Attys.

INTERMIX SELECTOR MECHANISM FOR RECORD CHANGERS

Filed Sept. 12, 1963

5 Sheets-Sheet 4

INVENTOR.
Ralph E. Freathy,
BY Brown Jackson Boettcher + Dienner
Attys.

INVENTOR.
Ralph E. Freathy,
BY Brown Jackson Boettcher + Dienner
Attys.

United States Patent Office 3,285,611

Patented Nov. 15, 1966

3,285,611
INTERMIX SELECTOR MECHANISM FOR RECORD CHANGERS

Ralph E. Freathy, Stevensville, Mich., assignor to V-M Corporation, Benton Harbor, Mich., a corporation of Michigan Filed Sept. 12, 1963, Ser. No. 308,592
12 Claims. (Cl. 274—10)

The present invention relates to an automatic record changer of the type adapted to handle a stack of intermixed records of at least three different sizes such as 7 inch, 10 inch and 12 inch records. More specifically, the invention relates to selector mechanism for a record changer adapted to sense the size of a record to be played and to control the set-down position of a tone arm in accordance therewith.

It is known in the art to provide selector mechanism which will permit a record changer to handle records of three different sizes so that a tone arm will be automatically positioned in accordance with the size of the record to be played. However, such mechanisms generally comprise a single selector arm which is moved varying distances when actuated by a record which is being dropped to the turntable, the amount of movement of the selector arm being dependent upon the size of the record which engages it. In other words, the selector arm is normally positioned in the path of both 10 inch and 12 inch records and it will be moved by a record of either of these sizes, but it will be moved a greater distance by a 12 inch record. Consequently, the size of a record which is dropped to the turntable for playing is determined by the extent of movement of the selector arm, and associated mechanism for stopping the tone arm in the proper set down position is actuated accordingly. The selector arm is positioned so that it will not be engaged by a 7 inch record, and the tone arm locating mechanism is designed so that when the selector arm remains stationary the tone arm will be set down in proper playing position on a 7 inch record.

The foregoing known selector mechanism is subject to certain serious disadvantages due to the fact that its successful operation is entirely dependent upon the premise that a certain size record will move the selector arm only that predetermined amount which is necessary to push the arm out of the path of travel of a falling record and permit the latter to drop to the turntable. However, due to the fact that records of the same size will often vary in weight, depending for example upon whether or not they have a coating of shellac, such records as they fall to the turntable will engage the selector arm with varying degrees of momentum. Consequently, a relatively heavy 10 inch record will at times engage the selector arm with sufficient momentum to move the arm well beyond the position to which it must be moved to permit the record to pass by, and in some cases such momentum will result in the selector arm being moved to a position corresponding to a 12 inch record even though in fact a 10 inch record has been dropped to the turntable. Obviously, in such instances the tone arm will not be properly positioned for reproducing the 10 inch record.

It is an object of the present invention to provide an improved intermix selector mechanism for record changers which permits intermixing of records of at least three different sizes and yet is independent of the weight or momentum of such records so as to be adapted to accurately sense the size of a record which is dropped to the turntable and effect positioning on the tone arm accordingly regardless of whether the records are shellac records or vinyl records or any other type or weight.

In furtherance of the foregoing object I provide at least two selector arms which are positioned for engagement by records of certain sizes when the latter are dropped to the turntable for playing. Thus, there is provided a 10 inch selector arm which is engageable by 10 inch records, and also by 12 inch records, and in addition I provide a 12 inch selector arm which is engageable only by 12 inch records. The two selector arms are both positioned out of the path of a 7 inch record so that neither will be engaged when a record of the latter type is dropped to the turntable for playing.

In combination with the foregoing I provide tone arm locating means for stopping the tone arm in a proper set down position, and each of the two selector arms is associated with the locating means so as to control the operation of the latter. Thus, the locating means is normally disposed to interrupt the inward travel of the tone arm in proper set down position for playing a 7 inch record, and when such a record is dropped it does not engage either of the two selector arms so that the locating means remains in its normal position corresponding to a 7 inch record. When a 10 inch record is dropped to the turntable the 10 inch selector arm is engaged and actuated, and it in turn acts upon the locating mechanism so as to cause the latter to stop the tone arm in proper set down position for playing a 10 inch record. In addition, when a 12 inch record is dropped to the turntable, both the 10 inch and 12 inch selector arms are engaged and actuated, and each of these in turn acts upon the locating means to cause the latter to stop the tone arm in proper set down position for playing a 12 inch record.

It is important to understand that the foregoing selector mechanism is wholly independent of the weight or momentum of the records. For example, the 10 inch selector arm will necessarily be moved at least a predetermined minimum amount when engaged by a 10 inch record and when thus moved it will actuate the tone arm locating means, and such selector arm will actuate the locating means in the same manner even if it is moved well beyond the above-mentioned minimum amount as when engaged with considerable momentum by an unusually heavy 10 inch shellac record. In fact a 12 inch record will normally move the 10 inch selector arm a much greater distance than a 10 inch record in order to get past it, and yet in either case the movement of the 10 inch selector arm produces the same effect on the tone arm locating mechanism.

The foregoing and other advantages and uses of my invention will be apparent from the following description thereof, taken in conjunction with the accompanying drawings in which.

Figures 3, 4:
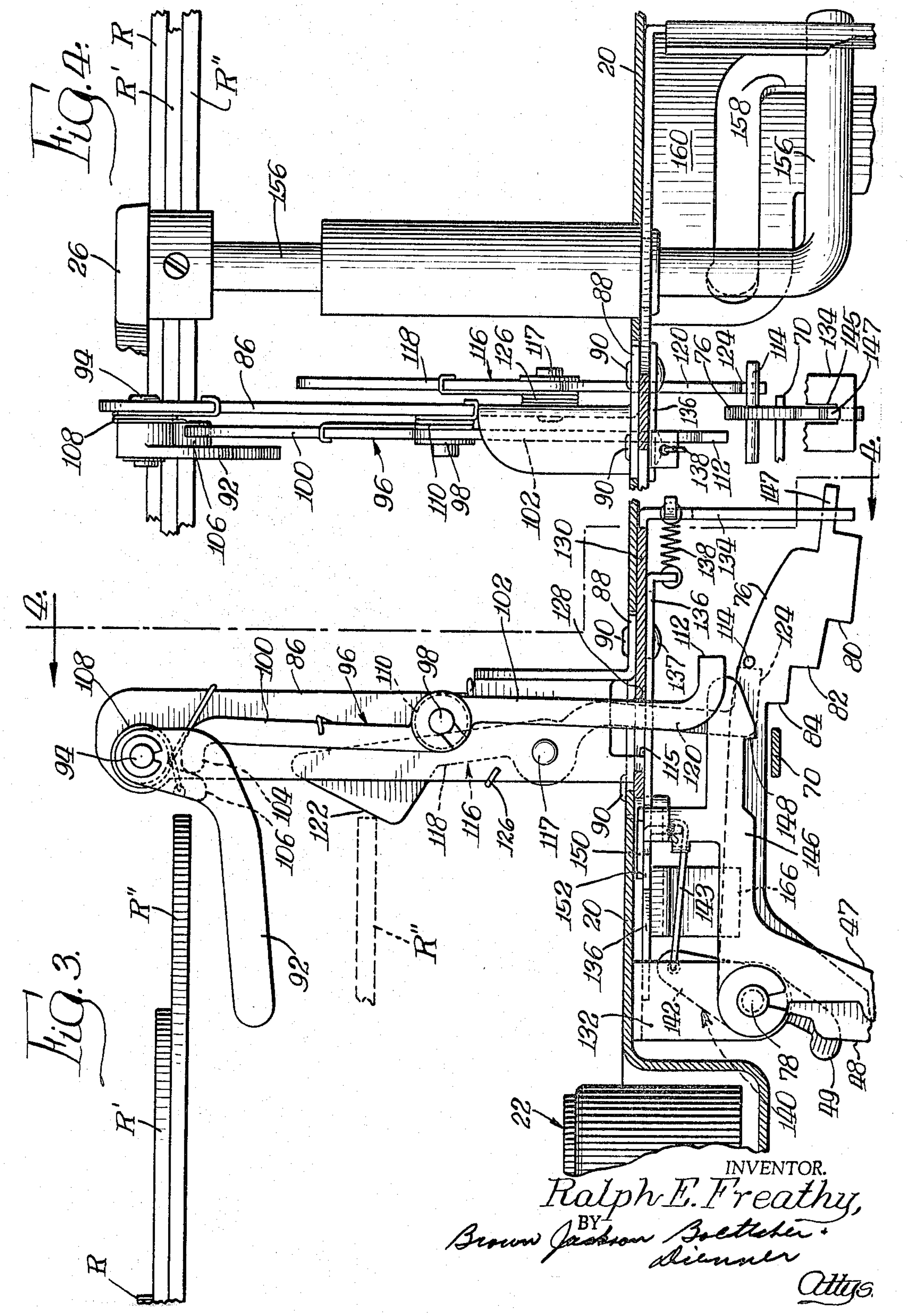
FIGURE 3 is an enlarged fragmentary vertical section, taken substantially along the line 3—3 of FIGURE 1, showing a pair of selector arms and also tone arm locating means which is controlled by such arms and which is shown positioned for stopping the tone arm in proper set down position for playing a 12 inch record.
FIGURE 4 is an elevational view, partly in section, looking substantially in the direction of the arrows 4—4 of FIGURE 3.
Figures 7, 8:
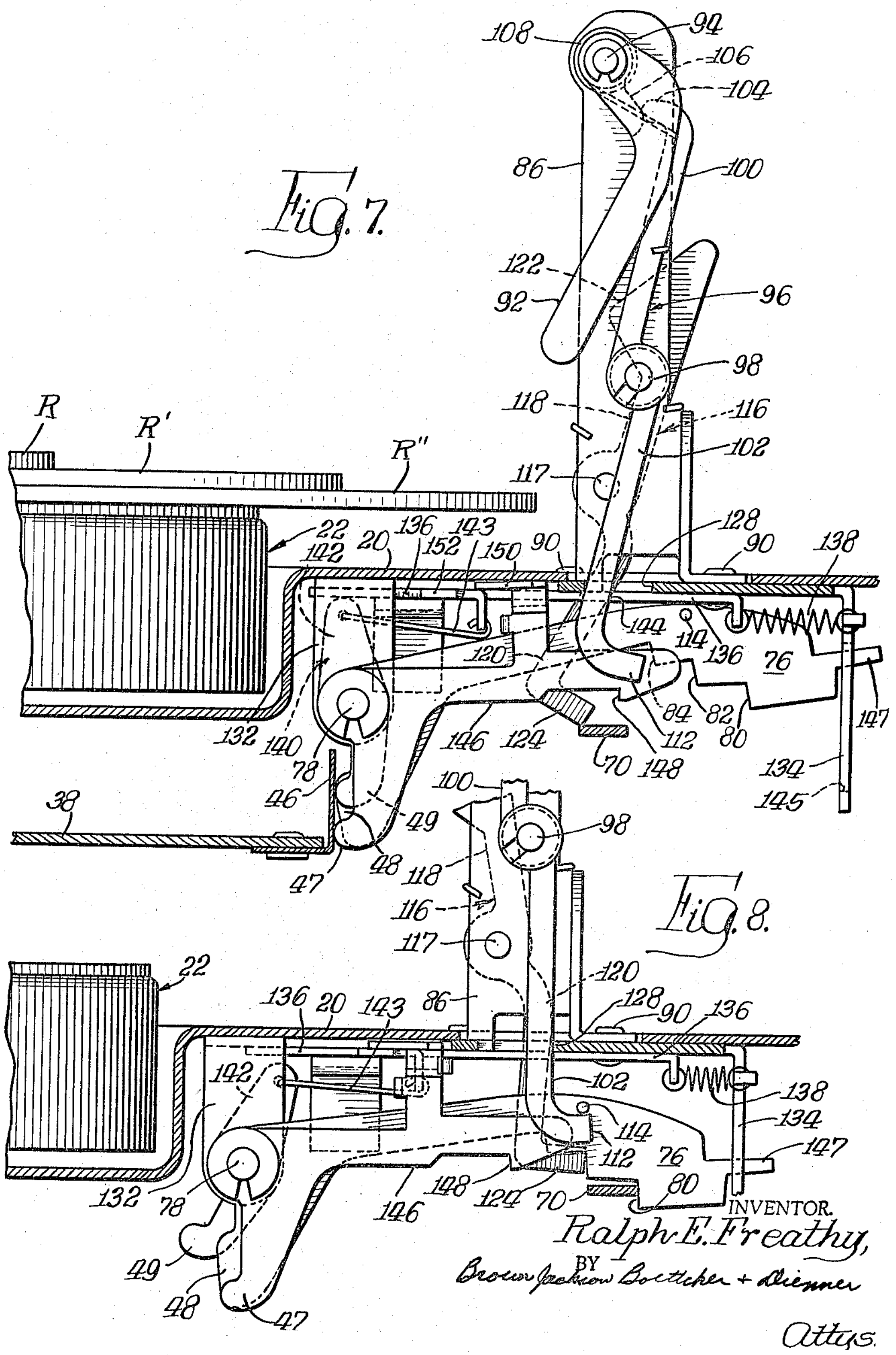

FIGURE 7 is another view similar to FIGURE 3 showing the two selector arms in retracted positions and showing the tone arm locating means raised to an inoperative position as is required during the playing of a record; and FIGURE 8 is still another view similar to FIGURE 3, partly broken away, showing the tone arm locating means positioned for stopping the tone arm in proper set down position for playing a 7 inch record.

Figure 1:
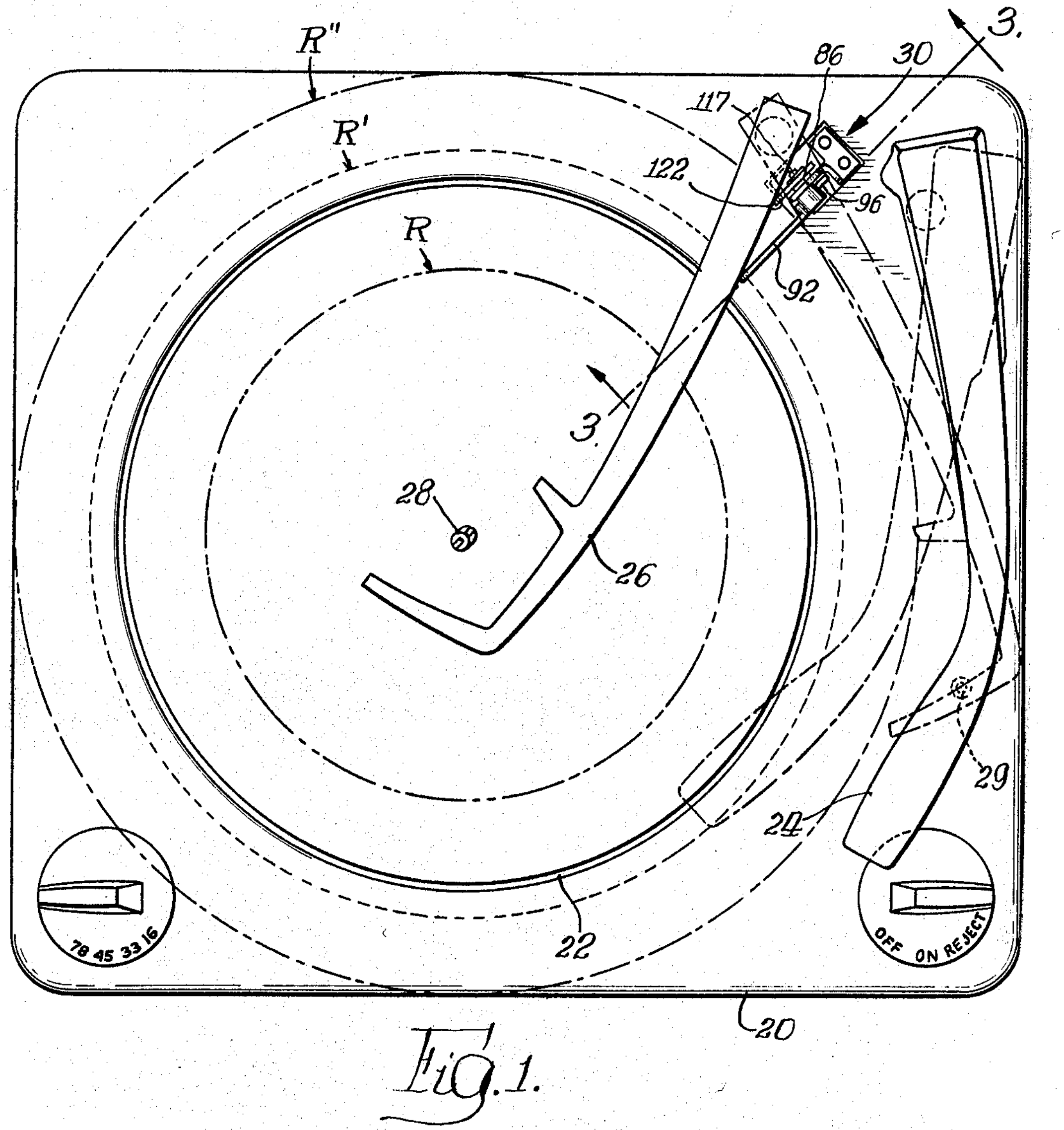
FIGURE 1 is a top plan view of an automatic record changer equipped with double arm size selector mechanism in accordance with the present invention.

Referring now to the drawings, FIGURE 1 shows a record changer comprising a baseplate 20, turntable 22, tone arm 24, record support arm 26, and record supporting spindle 28. Records of three different sizes are indicated at R, R′ and R″, and for purposes of the present description it may be assumed that such records are 7 inches, 10 inches and 12 inches in diameter, respectively. It will be seen that the tone arm 24 is shown in full lines in its radially outer position wherein it is disposed over a rest post 29, and it is shown in dash lines in playing position adjacent the edge of a 10 inch record R′. In addition, the record support arm 26 is shown in full lines in its radially inner position wherein it is adapted to overlie and stabilize a stack of records mounted on the spindle 28, and it is shown in dash lines in its radially outer inoperative position as when records are being loaded on or removed from the spindle. The selector mechanism of the present invention is indicated generally at 30 in FIGURE 1.

Figure 2:
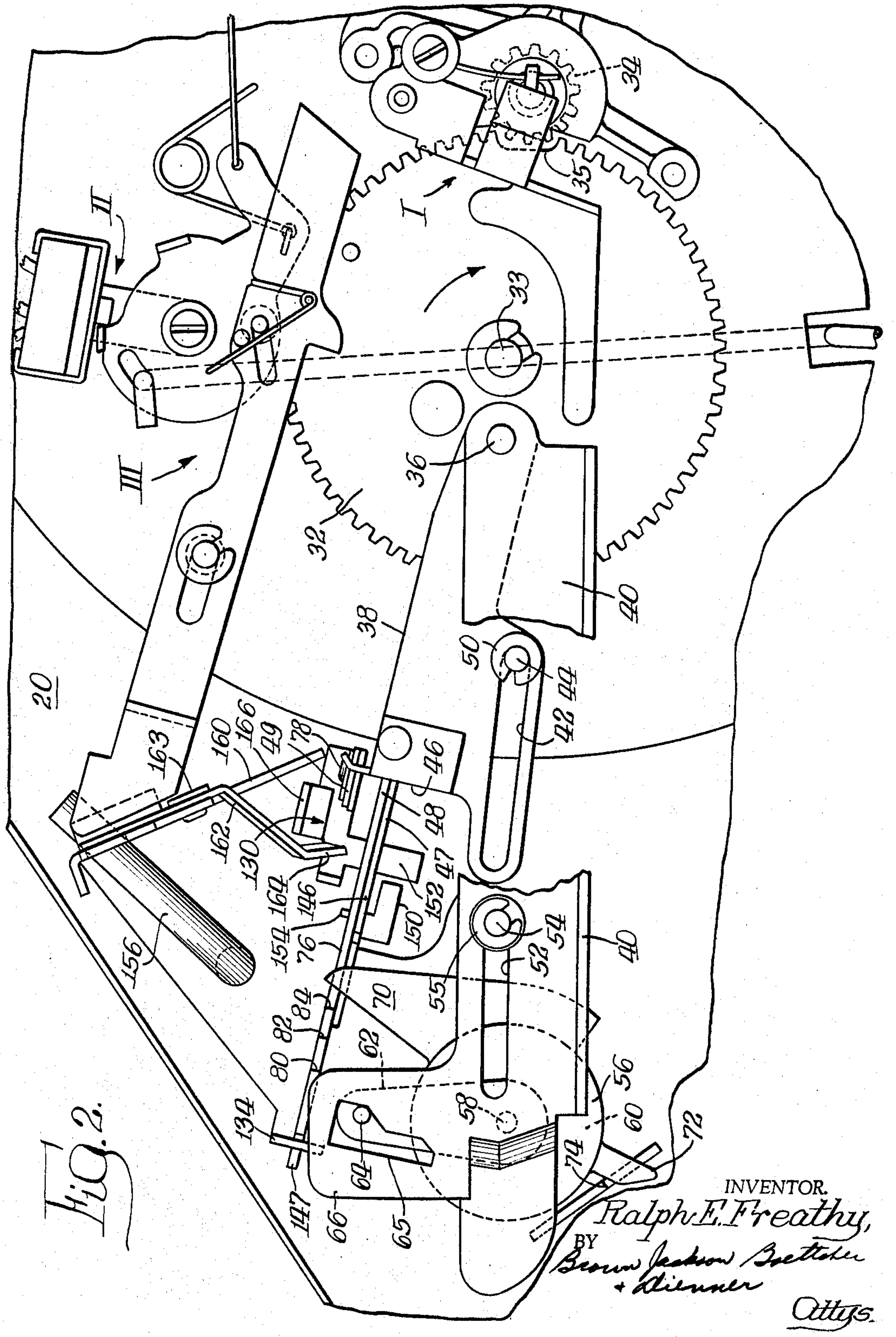
FIGURE 2 is an enlarged fragmentary bottom plan view of the record changer of FIGURE 1 illustrating tone arm locating means and certain control mechanism therefor.

Referring now to FIGURE 2, there is shown a large diameter drive gear 32 which is rotatably mounted on a stud 33 at the underside of the baseplate 20 and is rotated one revolution during each record change cycle by a pinion 34 formed on the turntable shaft. The drive gear 32, which is of a form known in the art, is shown in its normal inoperative position wherein a cutout portion 35 is located adjacent the pinion 34, and it will be understood that means (not shown) is provided to advance the drive gear into engagement with the pinion at the completion of the playing of a record so as to initiate a record change cycle.

The large drive gear 32 carries an eccentric pin 36 which has mounted thereon one end of a pusher link 38, and beneath the pusher link there is also mounted on the pin one end of a drive link 40. The drive link 40 is shown broken away so as to illustrate more clearly the structure of the pusher link 38 which includes an elongated slot 42 through which projects a pin 44 which is fixed to the underside of the baseplate 20. During the rotation of the drive gear 32 the link 38 is reciprocated back and forth and in this manner a pusher plate 46 on the link is moved into and out of engagement with three side-by-side arm members 47, 48, and 49, the latter comprising portions of pivoted levers which will be described more fully later herein. It will be understood that as the link 38 is reciprocated it slides along the fixed stud 44 and is held thereon by a lock washer 50.

The drive link 40 is provided with an elongated slot 52 through which projects a stud 54 which is fixed to the underside of the baseplate 20, the link being supported on the stud by a lock washer 55. A tone arm drive clutch 56 in rotatable on a vertical axis indicated at 58 which comprises the vertical axis of rotation of the tone arm 24. Immediately above the clutch 56 there is positioned a tone arm plate 60 (see FIGURE 6) which is rotationally fixed to the tone arm, whereby when the clutch 56 is on operative engagement with the tone arm plate 60, rotation of the clutch 56 will rotate the tone arm about its vertical axis 58 so as to swing the tone arm radially inwardly and outwardly. The clutch 56 includes a clutch lever 62 which is fixed thereto and carries a downwardly projecting pin 64 which extends through a slot 65 formed in a plate portion 66 of the drive link 40.

It will be seen from the foregoing that when the drive gear 32 is rotated one revolution during a record change cycle so as to reciprocate the drive link 40, the plate portion 66 of the drive link acts upon the clutch lever pin 64 so as to swing the tone arm 24 first radially outwardly to permit a record to be dropped to the turntable and then radially inwardly so as to position the tone arm over the edge of the record. Since the means for swinging the tone arm outwardly and inwardly does not itself comprise a part of the present invention, it will not be further described herein. It will be understood that the selector mechanism of the present invention may be used in conjunction with various types of tone arm drive mechanisms. A suitable form of tone arm drive mechanism which may be used in conjunction with the present invention is fully described in the copending application of Gerald H. Freier, No. 240,680, filed November 28, 1962 now Patent No. 3,218,078, and assigned to the assignee of the present invention.

FIGURE 2 further shows mechanism I for actuating means in the spindle 28 for dropping a record to the turntable during a change cycle, a main record changer on-off switch II, and shut-off mechanism III which automatically shuts off the switch II after the playing of the last record. The shut-off mechanism III is fully described in the copending application of Ralph E. Freathy and Robert J. Hammond, Serial No. 293,424, filed July 8, 1963, and assigned to the assignee of the present invention.

As described above, the tone arm plate 60 is connected with the tone arm 24 so as to rotate therewith, and as shown in FIGURE 2 the tone arm plate includes a projecting tone arm lever 70 which may be acted upon by locating means in order to control the set down position of the tone arm. In other words, as the tone arm is swung radially inwardly by means of the drive link 40 acting upon the clutch lever 62, it is possible to stop the tone arm at any desired set down position by stopping the tone arm lever 70, and thereafter the rotating clutch 56 will slip on the tone arm plate 60 so that the tone arm will remain in the desired set down position. It will also be noted that a projecting finger 72 formed on the tone arm plate 60 is adapted to cooperate with a fixed stop 74 so as to limit the outward swinging movement of the tone arm.

Referring now to FIGURES 2 and 3, a stepped locator arm 76 is pivotally mounted on a horizontal pin 78 and is provided with a plurality of steps 80, 82 and 84 which are adapted to cooperate with the tone arm lever 70 in order to stop the tone arm 24 in a desired set down position. When the tone arm is being swung inwardly over a record on the turntable 22, the tone arm lever 70 will rotate in a counterclockwise direction when viewed from below as in FIGURE 2, and thus the lever will move toward the steps 80, 82 and 84 on the locator arm 76. The locator arm 76 is pivotable upwardly and downwardly on the pivot pin 78 and it will be seen that when the arm is in its lowermost position as shown in FIGURE 3 the lever 70 will be stopped by the innermost step 84. In a similar manner, if the locator arm is in the position shown in FIGURE 5, the lever 70 will be stopped by the second step 82, and if the arm 76 is in the position shown in FIGURE 8 the lever 70 will be stopped by the outermost step 80 on the locator arm 76.

It will be understood that the step 80 being the outermost step will permit the greatest amount of inward travel of the tone arm 24, and this step thus corresponds with a 7 inch record. That is, if a 7 inch record is dropped to the turntable for playing, the locator arm 76 is disposed in the raised position of FIGURE 8 so that the inward travel of the tone arm 24 will not be interrupted until the tone arm lever 70 has engaged the step 80. In a similar fashion, when a 10 inch record is dropped to the turntable, the locator arm 76 is disposed in its intermediate vertical position as in FIGURE 5 so that the inward travel of the tone arm is interrupted when the tone arm lever 70 engages the step 82, and when a 12 inch record is dropped to the turntable, the locator arm must be disposed in the lowermost vertical position of FIGURE 3 so that the inward travel of the tone arm will be interrupted when the tone arm lever reaches the step 84.

The selector mechanism for sensing the size of a record to be played and controlling the position of the locator arm 76 in accordance therewith will now be described. FIGURES 3 and 4 show an upright mounting bracket 86 having a base portion 88 which is secured to the baseplate 20 by rivets 90 or other suitable fastening means. Adjacent the upper end of the bracket 86 a lever 92 which may be referred to as the 10 inch selector lever is pivotally mounted by means of a pin 94. The 10 inch selector lever 92 extends somewhat downwardly from the pivot pin 94 and then radially inwardly in the general direction of the spindle 28. The length of the lever 92 is such that it projects beneath the edge of a 10 inch record R′ which is mounted on the spindle 28, whereby when a 10 inch record is dropped to the turntable the lever 92 will be pivoted downwardly about the pivot pin 94. It will be clearly understood that when a 7 inch record R is dropped to the turntable it will not engage the lever 92, and when a 12 inch record R″ is dropped to the turntable it will pivot the lever 92 downwardly. While a 12 inch record will of course normally pivot the lever 92 a greater amount than a 10 inch record in order to displace the lever and thereby move past it, it is important to note, as will be explained more fully hereinafter, that the operation effected through movement of the lever 92 is the same in either instance.

A bellcrank lever 96 is pivotally mounted on the upright bracket 86 by a horizontal pivot pin 98, and the lever 96 comprises an upwardly extending arm 100 and a downwardly extending arm 102. Referring to FIGURE 3, the upper end of the arm 100 has a nose portion 104 which engages against a cam surface 106 which is formed integral with the lever 92, whereby when the lever 92 is engaged by a 10 inch or a 12 inch record and thereby pivoted in a counterclockwise direction about the pin 94, the cam surface 106 will engage the nose portion 104 and cause the bellcrank lever 96 to be pivoted in a clockwise direction about the pin 98. The lever 92 is biased in a counterclockwise direction as viewed in FIGURE 3 by a torsion spring 108, but it is normally held in the position shown in FIGURE 3 by the nose portion 104 of the lever 96 since the latter is biased in a counterclockwise direction by a torsion spring 110 (see FIGURE 4) which is of sufficient strength to overcome the force of the spring 108.

Figures 5, 6:
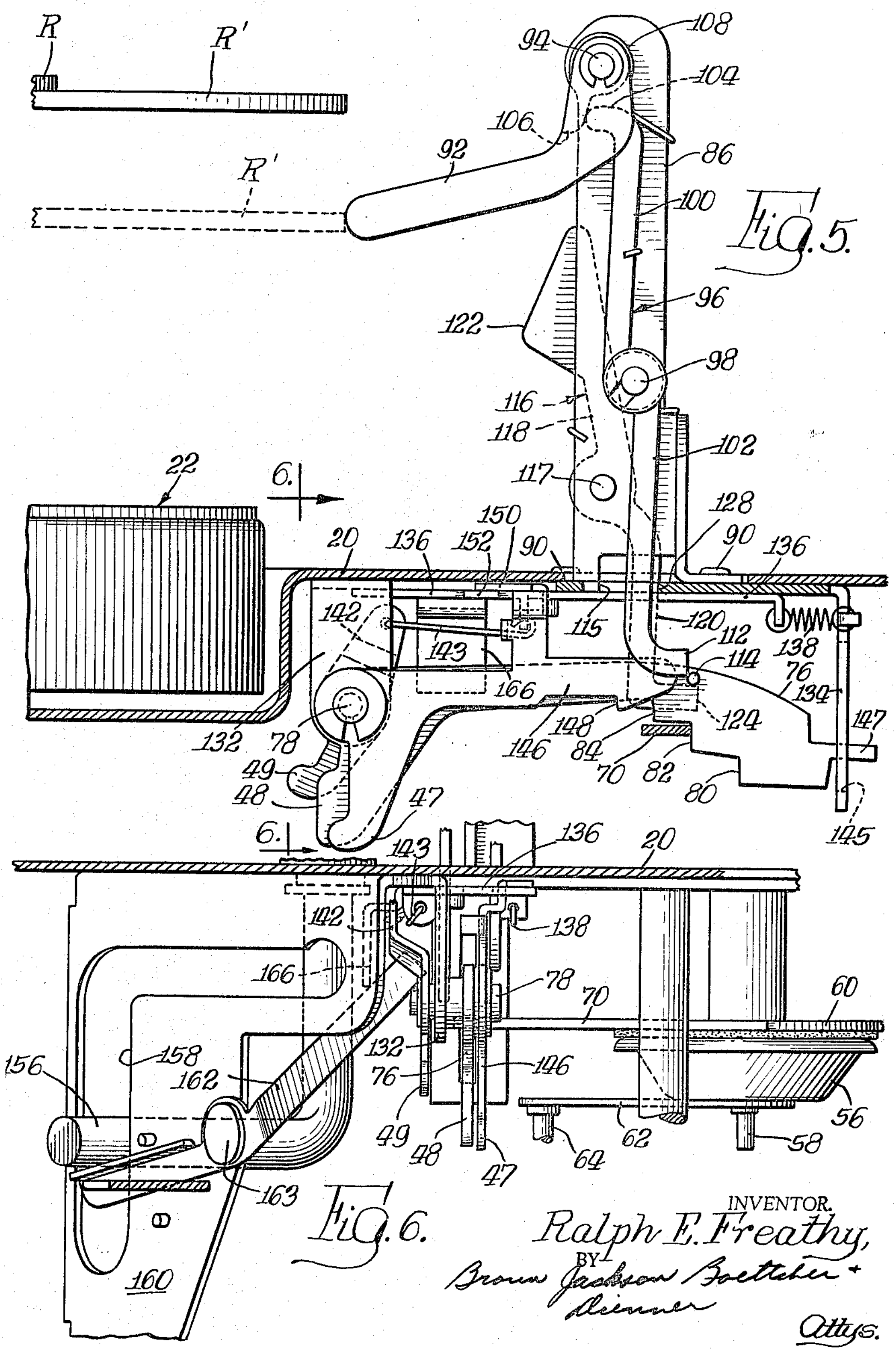
FIGURE 5 is a view similar to FIGURE 3 showing the tone arm locating means positioned to stop the tone arm in proper set down position for playing a 10 inch record.
FIGURE 6 is a fragmentary sectional view taken substantially along the line 6—6 of FIGURE 5.

The downwardly projecting bellcrank arm 102 has a generally horizontal hook portion 112 formed on its lower end for cooperation with a horizontal pin 114 which is carried by the locator arm 76 and extends therethrough. It will be noted that the bellcrank arm 102 extends down through an opening 115 in the baseplate 20 which is sufficiently large to permit the bellcrank 96 to pivot a predetermined limited amount about the pivot pin 98. When the locator arm 76 is in its uppermost position as shown in FIGURE 8, the hook portion 112 on the bellcrank 96 will underlie the pin 114 so as to support the locator arm. However, if a 10 inch or a 12 inch record is dropped from the spindle 28 so as to engage the lever 92 and pivot it in a counterclockwise direction, then the bellcrank 96 will be pivoted in a clockwise direction whereby the hook 112 will be moved out from under the pin 114 and the locator arm 76 will fall due to gravity to its intermediate position as shown in FIGURE 5.

A lever 116 is pivotally mounted on the upright bracket 86 by a pivot pin 117, the lever 116 being mounted at the opposite side of the bracket from the levers 92 and the bellcrank 96. The lever 116 has an upwardly extending arm 118 and a downwardly extending arm 120, and the arm 118 is provided with a projecting nose portion 122 which projects beneath the edge of a 12 inch record which is supported on the spindle 28. The lower arm 120 of the lever 116 is provided with a generally horizontal hook portion 124 which is normally adapted to extend beneath the pin 114 in the locator arm 76 as shown in FIGURES 5 and 8. In other words, the lever 116 is pivotable on its supporting pin 117 and is biased in a counterclockwise direction thereon by a torsion spring 126 (see FIGURE 4), and when the lever is in its counterclockwise position as shown in FIGURES 5 and 8 the nose portion 122 will project into the path of a 12 inch record and the hook 124 at the lower end of the lever will underlie the pin 114. It should be noted in FIGURE 8 for example that the counterclockwise positions of the bellcrank 96 and lever 116 are determined by an edge 128 (best shown in FIGURE 7) of the aperture 115 formed in the baseplate 20 since such edge limits the amount by which these members can be pivoted by their respective torsion springs 110 and 126.

After the tone arm 24 has been set down in playing position on a record on the turntable, it is necessary to raise the locator arm 76 to the extreme upper position shown in FIGURE 7 wherein it is inoperative and will permit the tone arm lever 70 to pass under it so that the tone arm can move inwardly to reproduce the record. It will further be recognized that it is desirable to retract the 10 inch lever 92 and the 12 inch lever 116 to the positions shown in FIGURE 7 after the tone arm has been properly positioned on a record so that they will not interfere with other operations such as the removal of records from the turntable. Thus, mechanism for moving the locator arm 76 to its raised inoperative position and for retracting the selector levers 92 and 116 will now be described.

A mounting plate 130 (see FIGURE 3) is fixedly mounted at the underside of the baseplate 20 and comprises a downwardly projecting arm 132 which carries the pin 78, and also a downwardly projecting plate 134. A slide plate 136 is slidably secured to the underside of the mounting plate 130 by rivets or the like such as shown at 137 which extend through longitudinal slots formed in the plate 136 so as to permit the latter to slide linearly a limited amount along the underside of the mounting plate 130. A tension spring 138 is connected between the downwardly extending bracket 134 and a depending tab on the plate 136 so as to bias the latter toward its right hand position as shown in FIGURE 3. A bellcrank lever 140 is pivotally mounted on the pin 78 and has an upwardly extending arm 142 which is connected to a second depending tab on the slide 136 by a wire link 143. Consequently, when the bellcrank 140 is pivoted in a counterclockwise direction as viewed in FIGURE 3, the link 143 pulls the slide 136 to its left hand position against the force of the tension spring 138.

Referring to FIGURE 7, the slide 136 has an aperture therein through which the lever arms 102 and 120 project so that the arms can extend downwardly through the slide. The right hand end of the aperture is defined by an edge portion 144 which is normally in alignment with or slightly to the right of the edge portion 128 of the opening in the baseplate 20 and mounting plate 130. However, when the slide 136 is moved to its left hand position, the edge portion 144 is moved to the left so as to engage the arms 102 and 120 and thereby pivot the levers 96 and 116 to their extreme clockwise or retracted positions as shown in FIGURE 7. When the lever 96 is thus pivoted to its clockwise position the nose portion 104 will retract whereby the torsion spring 108 will pivot the arm 92 in a counterclockwise direction to its retracted position wherein it extends generally downwardly as shown in FIGURE 7.

It will now be understood that whenever the bellcrank 140 is pivoted on the pin 78 from the position of FIGURE 3 to the position of FIGURE 7, the two selector levers 92 and 116 will be retracted. Such operation is accomplished through engagement of the pusher plate 46 with the downwardly projecting arm 49 of the bellcrank 140 in the manner shown in FIGURES 2 and 7. The manner in which the pusher link 38 is reciprocated was described earlier herein in connection with FIGURE 2, at which time it was noted that the pusher plate 46 on the link 38 is moved into and out of engagement with the arm member 49.

As shown in FIGURE 2, the pusher plate 46 will be in engagement with the arm 49 whenever the large drive gear 32 is in its normal inoperative position. That is, during a record change cycle the drive gear 32 is rotated one revolution, and the pusher plate 46 is moved out of engagement with the bellcrank arm 49 as the gear 32 begins its cycle of rotation and is moved back into engagement with the arm 49 as the gear completes its revolution. Consequently, the pusher plate 46 will normally be in the position shown in FIGURES 2 and 7 whereby the two selector arms 92 and 116 will normally be retracted, but during a record change cycle the pusher plate will be moved out of engagement with the bellcrank arm 49 whereby the slide 136 will be moved to its right hand position and the selector levers will be extended so that the lever 92 will extend into the path of both 10 inch and 12 inch records and the nose portion 122 on the lever 116 will project into the path of 12 inch records (approximately as shown in FIGURE 3).

It will be noted from FIGURE 2 that when the pusher plate 46 is in engagement with the bellcrank arm 49 it is also in engagement with the arm portion 48. As shown in FIGURE 3, 5, 7 and 8, the arm portion 48 comprises a downwardly extending arm which is integral with the locator arm 76, whereby when the pusher plate 46 engages the arm 48, the locator arm 76 will be pivoted in a counterclockwise direction on the pin 78 to its raised inoperative position of FIGURE 7. Thus, the locator arm 76 will normally be in its raised inoperative position as during the playing of a record, whereby it will not interfere with the inward travel of the tone arm, but at the initiation of a record change cycle the pusher plate 46 will move away from the arm portion 48 so that the locator arm will fall by gravity to the position of FIGURE 8 wherein it is supported by the hook 112 which underlies the pin 114. It will be noted that when the hook 112 and also the hook 124 are moved out from beneath the pin 114, the locator arm 76 moves to its lowermost position as shown in FIGURE 3, the latter position being determined by the length of a vertical slot 145 formed in the depending bracket 134 (see FIGURES 3 and 4) through which projects an extension 147 formed on the end of the locator arm 76. Thus, when the extension 147 reaches the lower end of the slot 145, the locator arm 76 cannot move further downwardly.

While I have described selector mechanism for controlling the proper set down of the tone arm 24 on a record which has been dropped to the turntable, it will be understood that it is necessary to provide additional mechanism for limiting the inward travel of the tone arm so that it will be set down on the rest post 29 (see FIGURE 1) when the automatic shut-off apparatus III is operated after the playing of the last record. Such mechanism will now be described, and referring to FIGURES 2 and 3 there is shown a lever 146 which is pivotally mounted on the pin 78 immediately adjacent the locator arm 76. The lever 146 has a step 148 formed adjacent one end thereof at its underside for cooperation with the tone arm lever 70, and if the lever 146 is pivoted in a clockwise direction from the position shown in FIGURE 3 so as to lower the step 148 into the path of the tone arm lever 70, then as the tone arm begins to move radially inwardly the lever 70 will engage the step 148 so as to stop the tone arm over the rest post 29.

In order to control the pivotal position of the lever 146, it is provided with a downwardly projecting arm 47 which is adapted to be engaged by the pusher plate 46 whenever the latter is in the position shown in FIGURES 2 and 7, and such engagement will pivot the lever 146 to its counterclockwise position of FIGURE 7 wherein it is inoperative. In addition, FIGURES 2 and 3 show a tab 150 which is formed integral with the lever 146 and which overlies a laterally projecting supporting tab 152 (best shown in FIGURE 2) formed on the slide plate 136 whenever the slide is in its right hand position (see FIGURE 3) to which it is biased by the tension spring 138. On the other hand, when the slide is moved to the left through engagement of the pusher plate 46 with the bellcrank arm 49 in the manner previously described, the tab 152 on the slide will move out from under the tab 150 on the lever 146 to a non-supporting position as shown in FIGURE 2. Further means for controlling the pivotal position of the lever 146 comprises a short tab 154 (see FIGURE 2) which is integral with the lever 146 and projects over the top of the locator arm 76, whereby the lever 146 cannot be lowered unless the arm 76 is also lowered.

From the foregoing it will be seen that during a record change cycle when the pusher plate 46 is moved away from the bellcrank arm 49, the slide 136 will be in a position wherein the tab 152 thereon will underlie the tab 150 on the lever 146 and will support the latter in its upper inoperative position, and of course at other times the lever 146 will be held inoperative due to the engagement of the pusher plate 46 with the arm portion 47 on the lever 146. However, those skilled in the art will understand that during the playing of the last record the record support arm 26 (see FIGURE 1) will have moved to its lowermost position whereby a rod 156 (see FIGURE 6) on which the record support arm is carried will have moved toward the lower end of a slot 158 in a bracket 160 so as to pivot a bellcrank lever 162 about a pivot pin 163. Referring now to FIGURE 2, when the bellcrank 162 is pivoted by the rod 156 in the manner described, an end portion 164 of the bellcrank will move in back of a downwardly projecting tab 166 on the slide 136 so as to lock the slide in the position of FIGURE 2. Consequently, during the next change cycle after the playing of the last record, the pusher plate 46 will move away from the arm portions 47, 48 and 49 but the slide 136 will remain locked in the position of FIGURE 2, the selector levers 92 and 116 will remain retracted in the positions of FIGURE 7, and the lever 146 will fall by gravity to its lower operative position wherein the step 148 thereon will engage the tone arm lever 70 and will thus stop the tone arm 24 over the rest post 29.

I will now review briefly the operation of the intermix size selector mechanism of the present invention. During the playing of a record the pusher link 38 and pusher plate 46 will be in the positions shown in FIGURE 2, and thus the 10 inch selector lever 92 and the 12 inch selector lever 116 will be in their retracted positions and the locator arm 76 will be in its upper inoperative position, all as shown in FIGURE 7. At the completion of the playing of a record the large drive gear 32 (see FIGURE 2) will begin its one revolution of travel and the pusher plate 46 will move away from the arm members 47, 48 and 49. The pusher plate 46 will release the arm 49 first and will thus permit the slide 136 to be moved to its right hand position as shown in FIGURES 3, 5 and 8 by the tension spring 138, whereby the selector lever 92 will be extended into the path of 10 inch and 12 inch records and the projecting portion 122 on the lever 116 will be extended into the path of 12 inch records. With the selector levers thus extended the hook portion 112 at the lower end of the bellcrank 96 and the hook portion 124 at the lower end of the lever 116 will move to the positions shown in FIGURE 8 wherein they underlie the pin 114 on the locator arm 76. Consequently, as the pusher plate 46 moves away from the arm portion 48 on the locator arm 76, the latter will fall by gravity to the position of FIGURE 8 wherein the pin 114 will be supported on the hook portion 112.

As the record change cycle continues, the tone arm 24 will be moved outwardly approximately to the position of FIGURE 1, and a record will be dropped from the spindle 28 to the turnable 22 for playing. If a 7 inch record is dropped to the turntable it will not strike either the selector lever 92 or the projecting portion 122 of the selector lever 116, and thus the locator arm 76 will remain in the position of FIGURE 8. Thus, as the tone arm 24 is swung inwardly the tone arm lever 70 will engage the step 80 on the locator arm 76 so as to interrupt the inward movement of the tone arm in proper set down position for the playing of a 7 inch record.

If the record dropped to the turntable is a 10 inch record, then it will strike the selector lever 92 and pivot it downwardly approximately to the position shown in FIGURE 5. In this instance, the lever 92 will pivot the bellcrank lever 96 in a clockwise direction so as to move the hook portion 112 out from beneath the pin 114 on the locator arm 76, thus permitting the latter to drop until the pin 114 is supported on the second hook portion 124 at the lower end of the 12 inch lever 116. The bellcrank 96 is biased by the torsion spring 110 (see FIGURE 4) to return to its original position, but as shown in FIGURE 5 the pin 114 will be disposed against the end of the hook portion 112 to prevent the full return thereof. When the locator arm 76 is disposed as shown in FIGURE 5, the tone arm lever 70 will be stopped by the step 82 on the locator arm so as to interrupt the inward movement of the tone arm 24 when it is in proper set down position for the playing of a 10 inch record.

If a 12 inch record is dropped to the turntable, it will first engage the selector lever 92 so as to release the hook 112 and position the locator arm 76 in the position of FIGURE 5 in the manner described above. However, as the record continues to fall, it will then engage the projecting portion 122 on the selector lever 116 and will pivot the latter in a clockwise direction so as to move the hook portion 124 out from beneath the pin 114. In this instance, the locator arm 76 will fall by gravity to its lowermost position as shown in FIGURE 3 wherein an extension 147 thereon will engage the lower end of the slot 145 in the depending bracket 134. The selector lever 116 will be biased toward its original position by the torsion spring 126 (see FIGURE 4), but as shown in FIGURE 3 the pin 114 will be engaged against the end of the hook portion 124 to prevent the immediate return thereof. When the locator arm 76 is in its lower-most position as in FIGURE 3, the tone arm lever 70 will engage against the step 84 on the locator arm whereby as the tone arm is swung inwardly its travel will be interrupted when it is in proper set down position for the playing of a 12 inch record.

At the completion of the record change cycle the pusher plate 46 moves back into engagement with the arm portions 47, 48 and 49. As shown in FIGURES 3, 5 and 8, the arm portion 49 projects outwardly further than the arm portions 47 and 48, and thus the pusher plate will engage the arm 49 first so as to retract the selector levers 92 and 116 to the positions of FIGURE 7 and thus move the hook portions 112 and 124 away from the pin 114 on the locator arm 76. Then, as the pusher plate 46 engages the arm portion 48, the locator arm 76 will be pivoted to its upper inoperative position of FIGURE 7 so as not to interfere with the further inward movement of the tone arm 24 during the playing of the record on the turntable.

While I have illustrated my invention in a preferred form, I do not intend to be limited to that form, except insofar as the appended claims are so limited, since modifications coming within the scope of my invention will be readily suggested to others with my disclosure before them.

I claim:

1. In a record changer of the type adapted to handle a plurality of intermixed records of at least three different sizes and having a tone arm adapted during a record change cycle to be raised to an elevated position and moved first radially outwardly to permit a new record to be dropped from a spindle to a turntable associated therewith and then radially inwardly to set down in playing position on the new record, the improvement comprising, in combination, a tone arm, and positioning means for interrupting inward swinging movement of said tone arm to stop the latter in proper set down position for playing a record on the turntable, said positioning means including engagement means and vertically adjustable stop means normally disposed at a height where it is adapted to engage said engagement means and stop said tone arm in proper set down position for playing a small size record, first movable selector means positioned for engagement and movement by records of predetermined sizes as they drop to the turntable, said first movable selector means being positioned out of the drop path of small size records and in the drop path of both intermediate and large size records, means responsive to movement of said first movable selector means which shift said stop means to an intermediate height where it is adapted to engage said engagement means for stopping said tone arm in proper set down position for playing an intermediate size record, second movable selector means positioned for engagement and movement by records of a predetermined size as they drop to the turntable, said second movable selector means being positioned out of the drop path of both small and intermediate size records and in the drop path of large size records, and means responsive to movement of said second movable selector means which shift said stop means to a further height where it is adapted to engage said engagement means for stopping said tone arm in proper set down position for playing a large size record, whereby said tone arm will be set down in a playing position corresponding to the size of the record to be played.

2. The invention of claim 1 wherein said first and second movable selector means each comprises a pivotally mounted lever adapted to be pivoted when engaged by a record which is being dropped to the turntable.

3. The invention of claim 2 wherein each of said pivotally mounted levers is pivotal about a generally horizontal axis.

4. In a record changer of the type adapted to handle a plurality of intermixed records of at least three different sizes and having a tone arm adapted during a record change cycle to be raised to an elevated position and moved first radially outwardly to permit a new record to be dropped from a spindle to a turntable associated therewith and then radially inwardly to set down in playing position on the new record, the improvement comprising, in combination, a baseplate, a tone arm, and positioning means for interrupting inward swinging movement of said tone arm to stop the latter in proper set down position for playing a record on the turntable, said positioning means including engagement means associated with said tone arm for rotation therewith and vertically adjustable stop means on said base plate normally disposed at a height where it is adapted to engage said engagement means and stop said tone arm in proper set down position for playing a small size record, upright support means mounted on said baseplate, first movable selector means positioned for engagement and movement by records of predetermined sizes as they drop to the turntable, said first selector means comprising a first lever mounted on said support means for pivotal movement about a generally horizontal axis, said first lever being positioned out of the drop path of small size records and in the drop path of both intermediate and large size records, means responsive to pivotal movement of said first lever which shift said stop means to an intermediate height where it is adapted to engage said engagement means for stopping said tone arm in proper set down position for playing an intermediate size record, second movable selector means positioned for engagement and movement by records of a predetermined size as they drop to the turntable, said second selector means comprising a second lever mounted on said support means for pivotal movement about a generally horizontal axis, said second lever being positioned out of the drop path of both small and intermediate size records and in the drop path of large size records, and means responsive to pivotal movement of said second lever which shift said stop means to a further height where it is adapted to engage said engagement means for stopping said tone arm in proper set down position for playing a large size record, whereby said tone arm will be set down in a playing position corresponding to the size of the record to be played.

5. The invention of claim 4 wherein first spring means is provided to bias said first lever into the drop path of intermediate and large size records and second spring means is provided to bias said second lever into the drop path of large size records whereby when said levers are engaged by such records they will be temporarily pivoted out of said drop paths to permit such records to drop to the turntable.

6. The invention of claim 4 wherein said means responsive to pivotal movement of said first lever comprises a bellcrank lever mounted on said support means for pivotal movement about a generally horizontal axis, said bellcrank lever having one end engaged against said first lever so as to be actuated thereby and having its other end associated with said positioning means whereby upon actuation of said bellcrank lever by said first lever said positioning means will be conditioned for stopping said tone arm in proper set down position for playing an intermediate size record.

7. The invention of claim 4 wherein said first and second levers are vertically spaced from one another on said support means whereby a large size record will first engage one of said levers and pass thereby and will subsequently engage and pass by the other of said levers as it drops to the turntable.

8. In a record changer of the type adapted to handle a plurality of intermixed records of at least three different sizes and having a tone arm adapted during a record change cycle to be raised to an elevated position and moved first radially outwardly to permit a new record to be dropped from a spindle to a turntable associated therewith and then radially inwardly to set down in playing position on the new record, the improvement comprising in combination, a baseplate, a tone arm, positioning means for interrupting inward swinging movement of said tone arm to stop the latter in proper set down position for playing a record on the turntable, said positioning means normally being adapted to stop said tone arm in proper set down position for playing a small size record, upright support means mounted on said baseplate, first movable selector means positioned for engagement and movement by records of predetermined sizes as they drop to the turntable, said first selector means comprising a first lever mounted on said support means for pivotal movement about a generally horizontal axis, first spring means for biasing said first lever into a position wherein it is out of the drop path of small size records and in the drop path of both intermediate and large size records, means responsive to pivotal movement of said first lever for conditioning said positioning means for stopping said tone arm in proper set down position for playing an intermediate size record, said last-mentioned means including a bellcrank lever mounted on said support means for pivotal movement about a generally horizontal axis, said bellcrank lever having one end engaged against said first lever so as to be actuated thereby and having its other end associated with said positioning means, second movable selector means positioned for engagement and movement by records of a predetermined size as they drop to the turntable, said second selector means comprising a second lever mounted on said support means for pivotal spring means for biasing said second lever into a position wherein it is out of the drop path of both small and intermediate size records and in the drop path of large size records, means responsive to pivotal movement of said second lever for conditioning said positioning means for stopping said tone arm in proper set down position for playing a large size record, said first and second levers being vertically spaced from one another on said support means whereby a large size record will first engage one of said levers and pass thereby and will subsequently engage and pass by the other of said levers as it drops to the turntable and means for retracting both said first and second levers against the force of said first and second spring means whenever said record changer is not engaged in a record change cycle.

9. In a record changer of the type adapted to handle a plurality of intermixed records of at least three different sizes and having a tone arm adapted during a record change cycle to be raised to an elevated position and moved first radially outwardly to permit a new record to be dropped from a spindle to a turntable associated therewith and then radially inwardly to set down in playing position on the new record, the improvement comprising, in combination, a tone arm, a rotatable member fixedly associated with said tone arm for rotation therewith about a generally vertical axis and having projecting means thereon, a locator member pivoted at one end about a generally horizontal axis and having a plurality of spaced edge portions at different vertical levels thereon whereby depending upon the vertical position of said locator a selected one of said edge portions will engage said projecting means to interrupt inward swinging movement of said tone arm to stop the latter in proper set down position for playing a record on the turntable, first movable selector means positioned for engagement and movement by records of predetermined sizes as they drop to the turntable, said first movable selector means being positioned out of the drop path of small size records and in the drop path of both intermediate and large size records, first supporting means for normally supporting said locator member in a raised position wherein it will interrupt inward swinging movement of said tone arm to stop the latter in proper set down position for playing a small size record, said first supporting means being movable to an inoperative position by said first selector means where the latter is engaged by a record, second movable selector means positioned for engagement and movement by records of a predetermined size as they drop to the turntable, said second movable selector means being positioned out of the drop path of both small and intermediate size records and in the drop path of large size records, second supporting means for supporting said locator member in an intermediate vertical position wherein it will interrupt inward swinging movement of said tone arm to stop the latter in proper set down position for playing an intermediate size record, said second supporting means being movable to an inoperative position by said second selector means when the latter is engaged by a record, and third supporting means for supporting said locator member in a lowered position wherein it will interrupt inward swinging movement of said tone arm to stop the latter in proper set down position for playing a large size record, said third supporting means being operative whenever both said first and second supporting means are moved to inoperative positions.

10. The invention of claim 9 wherein said first and second selector means each comprises a pivotally mounted lever adapted to be pivoted when engaged by a record which is being dropped to the turntable.

11. In a record changer of the type adapted to handle a plurality of intermixed records of at least three different sizes and having a tone arm adapted during a record change cycle to be raised to an elevated position and moved first radially outwardly to permit a new record to be dropped from a spindle to a turntable associated therewith and then radially inwardly to set down in playing position on the new record, the improvement comprising, in combination, a baseplate, a tone arm, a rotatable member fixedly associated with said tone arm for rotation therewith about a generally vertical axis and having projecting means thereon, a locator member pivoted at one end about a generally horizontal axis and having a plurality of spaced edge portions at different vertical levels thereon whereby depending upon the vertical position of said locator a selected one of said edge portions will engage said projecting means to interrupt inward swinging movement of said tone arm to stop the latter in proper set down position for playing a record on the turntable, upright support means mounted on said baseplate, first movable selector means positioned for engagement and movement by records of predetermined sizes as they drop to the turntable, said first movable selector means comprising a first lever mounted on said upright support means for pivotal movement about a generally horizontal axis, said first lever being positioned out of the drop path of small size records and in the drop path of both intermediate and large size records, a bellcrank lever mounted on said upright support means for pivotal movement about a generally horizontal axis, said bellcrank having an upper end engaged against said first lever so as to be actuated thereby and having first supporting means associated with its lower end for normally supporting said locator member in a raised position wherein it will interrupt inward swinging movement of said tone arm to stop the latter in proper set down position for playing a small size record, said first supporting means being movable to an inoperative position when said first lever is engaged by a record, second movable selector means positioned for engagement and movement by records of a predetermined size as they drop to the turntable, said second selector means comprising a second lever mounted on said upright support means for pivotal movement about a generally horizontal axis, said second lever being positioned out of the drop path of both small and intermediate size records and in the drop path of large size records, said second lever having second supporting means associated with its lower end for supporting said locator member in an intermediate vertical position wherein it will interrupt inward swinging movement of said tone arm to stop the latter in proper set down position for playing an intermediate size record, said second supporting means being movable to an inoperative position when said second lever is engaged by a record, and third supporting means for supporting said locator member in a lowered position wherein it will interrupt inward swinging movement of said tone arm to stop the latter in proper set down position for playing a large size record, said third supporting means being operative whenever both said first and second supporting means are moved to inoperative positions.

12. In a record changer of the type adapted to handle a plurality of intermixed records of at least three different sizes and having a tone arm adapted during a record change cycle to be raised to an elevated position and moved first radially outwardly to permit a new record to be dropped from a spindle to a turntable associated therewith and then radially inwardly to set down in playing position on the new record, the improvement comprising, in combination, a baseplate, a tone arm, positioning means for interrupting inward swinging movement of said tone arm to stop the latter in proper set down position for playing a record on the turntable, said positioning means normally being adapted to stop said tone arm in proper set down position for playing a small size record, upright support means mounted on said baseplate, first movable selector means positioned for engagement and movement by records of predetermined sizes as they drop to the turntable, said first selector means comprising a first lever mounted on said support means for pivotal movement about a generally horizontal axis, first spring means for biasing said first lever into a position where it is out of the drop path of small size records and is in the drop path of both intermediate and large size records, means responsive to pivotal movement of said first lever for conditioning said positioning means for stopping said tone arm in proper set down position for playing an intermediate size record, second movable selector means positioned for engagement and movement by records of a predetermined size as they drop to the turntable, said second selector means comprising a second lever mounted on said support means for pivotal movement about a generally horizontal axis, second spring means biasing said second lever into a position where it is out of the drop path of both small and intermediate size records and is in the drop path of large size records, means responsive to pivotal movement of said second lever for conditioning said positioning means for stopping said tone arm in proper set down position for playing a large size record whereby said tone arm will be set down in a playing position corresponding to the size of the record to be played, and means for retracting both said first and second levers against the force of said first and second spring means whenever said record changer is not engaged in a record change cycle.

References Cited by the Examiner

UNITED STATES PATENTS

| | | | |
|---|---|---|---|
| 2,868,547 | 1/1959 | Vistain | 274—10 X |
| 2,939,714 | 6/1960 | Dennis | 274—10 |
| 3,033,576 | 5/1962 | Bara | 274—10 |

NORTON ANSHER, *Primary Examiner.*

JOHN M. HORAN, *Examiner.*

J. F. PETERS, Jr., *Assistant Examiner.*

UNITED STATES PATENT OFFICE
CERTIFICATE OF CORRECTION

Patent No. 3,285,611

November 15, 1966

Ralph E. Freathy

It is hereby certified that error appears in the above numbered patent requiring correction and that the said Letters Patent should read as corrected below.

Column 12, line 5, after "pivotal" insert -- movement about a generally horizontal axis, second --.

Signed and sealed this 12th day of September 1967.

(SEAL)
Attest:

ERNEST W. SWIDER
Attesting Officer

EDWARD J. BRENNER
Commissioner of Patents